United States Patent [19]

Doi et al.

[11] 4,294,521
[45] Oct. 13, 1981

[54] REAR STOP TYPE ZOOM LENS

[75] Inventors: Yoshikazu Doi; Yutaka Sakai; Kazunori Ohno, all of Omiya, Japan

[73] Assignee: Fuji Photo Optical Co., Ltd., Japan

[21] Appl. No.: 71,042

[22] Filed: Aug. 30, 1979

[30] Foreign Application Priority Data

Sep. 1, 1978 [JP] Japan ................... 53-107735

[51] Int. Cl.³ .................................. G02B 15/16
[52] U.S. Cl. ................................. 350/426; 350/449
[58] Field of Search ............. 350/176, 184, 186, 206, 350/426, 449

[56] References Cited

U.S. PATENT DOCUMENTS 3,143,590 8/1964 Higuchi .................. 350/184
3,348,898 10/1967 Baur et al. ............... 350/184
4,189,212 2/1980 Mizutani et al. .......... 350/184

Primary Examiner—John K. Corbin
Assistant Examiner—Scott J. Sugarman
Attorney, Agent, or Firm—Eyre, Mann, Lucas & Just

[57] ABSTRACT

A compact rear stop type zoom lens suitable for use with a camera having an electronically controlled shutter. The rear stop type zoom lens is comprised of two lens groups which effect variation in magnification when moved in opposite directions on the optical axis of the entire lens.

2 Claims, 21 Drawing Figures

SPHERICAL ABERRATION
SINE CONDITION

ASTIGMATISM

DISTORTION

SPHERICAL ABERRATION
SINE CONDITION

ASTIGMATISM

DISTORTION

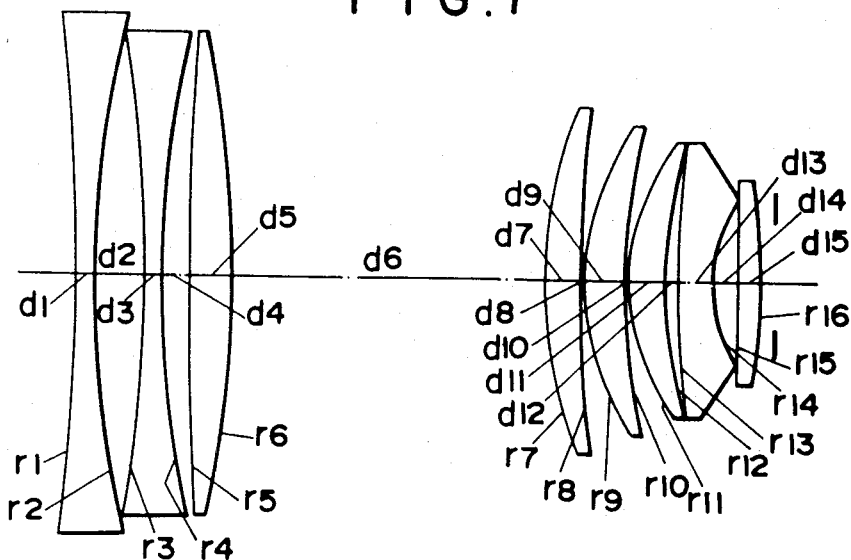
FIG. 7
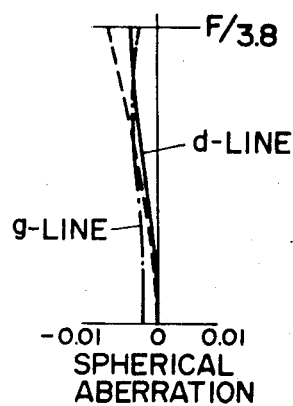
FIG. 8A, FIG. 8B, FIG. 8C
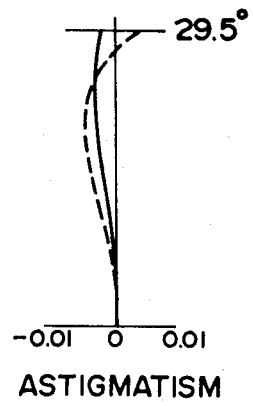
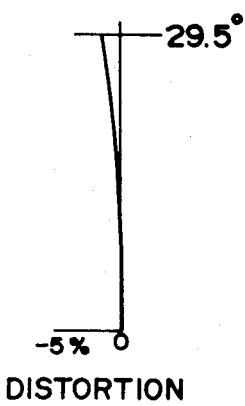
FIG. 9A, FIG. 9B, FIG. 9C

REAR STOP TYPE ZOOM LENS

BACKGROUND OF THE INVENTION

1. Field of the Invention

This invention relates to a rear stop type zoom lens, and more particularly to a retrofocus type zoom lens well compensated for aberration and constructed compactly in size.

2. Description of the Prior Art

In recent years, electronically controlled shutters have come to be adopted in an increasingly greater number of medium-priced cameras. Unlike the conventional mechanical shutters, shutters of this type are located wholly outside the lens systems and the sectors thereof can be concurrently used as stops. They are therefore advantageous in terms of structural simplicity and lower cost. Consequently, rear stop type lenses have come to find popular acceptance. If a rear stop type zoom lens capable of using such an electronically controlled shutter can be provided, this would make an immense contribution from the practical point of view because it would lead to successful incorporation of a zoom lens system in medium-priced cameras using electronically controlled shutters.

In this type zoom lens, however, the diaphragm is positioned externally to the rear and, moreover, the shutter is fixed in position on the camera body because of restrictions from the standpoint of mechanical structure. For this type zoom lens to secure a sufficient amount of marginal ray, therefore, it tends to be considerably greater size than a conventional zoom lens provided with an internal diaphragm. Besides, since the principal ray is separated greatly from the optical axis of the lens, compensation for astigmatism, comatic aberration, etc. is considerably more difficult than in an ordinary lens.

SUMMARY OF THE INVENTION

It is, therefore, the object of this invention to provide a rear stop type zoom lens which is free of the difficulties described above.

BRIEF DESCRIPTION OF THE DRAWING

FIG. 7 is a structural diagram which shows yet another preferred embodiment of the rear stop type zoom lens of the present invention, and FIGS. 8A–8C and 9A–9C show the spherical aberration and sine condition (8A, 9A), astigmatism (8B, 9B) and distortion (8C, 9C) respectively on the wide angle side (8A–8C) and the telephoto side (9A–9C) of the third preferred embodiment.

PREFERRED EMBODIMENTS OF THE INVENTION

Figure 1:
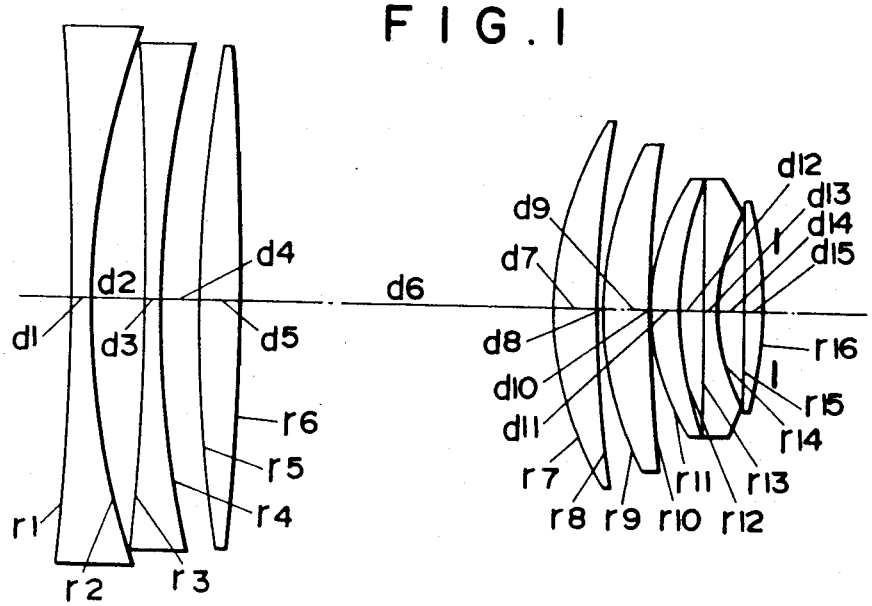
FIG. 1 is a structural diagram which shows a preferred embodiment of the rear stop type zoom lens of the present invention.
Figure 2A:
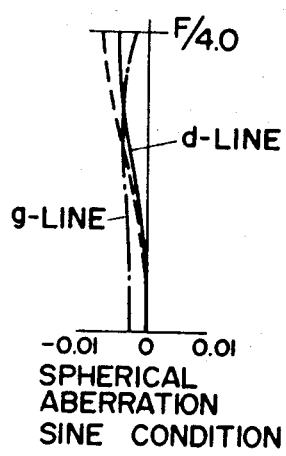
FIGS. 2A–2C and 3A–3C show the spherical aberration and sine condition (2A, 3A), astigmatism (2B, 3B) and distortion (2C, 3C) respectively on the wide angle side (2A–2C) and the telephoto side (3A–3C) of the first preferred embodiment.
Figure 2B:
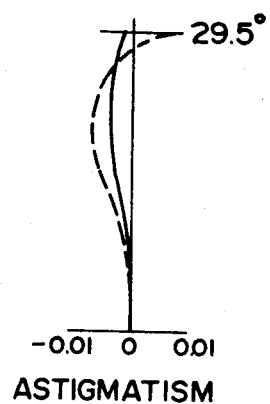
Figure 2C:
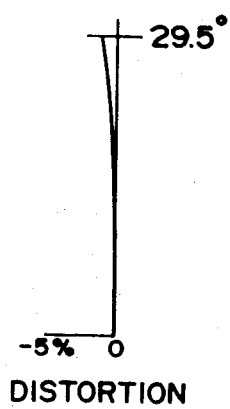
Figure 3A:
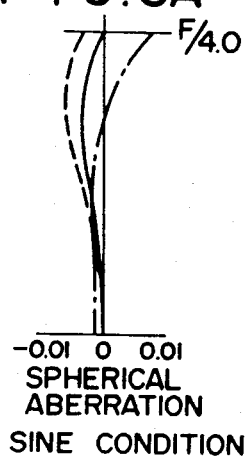
Figure 3B:
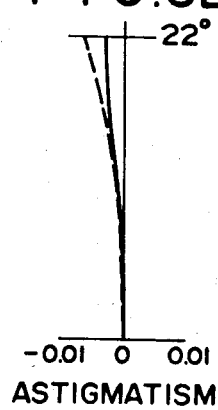
Figure 3C:
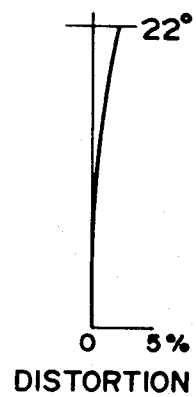

The zoom lens according to this invention is composed of a front lens group having negative refracting power and a rear lens group having positive refracting power relative to the object side, effecting variation in magnification by the two lens groups being moved in mutually opposite directions along the optical axis of the entire lens, having its diaphragm fixed externally to the rear of the rear lens group, having the front lens group consisting of two biconcave lenses L1 and L2 and one convex lens L3 and the rear lens group consisting of three convex meniscus lenses L4, L5 and L6 each having its convex surface on the object side, one concave lens L7 and one convex lens, and satisfying the following conditions:

(1) $-2.4 < F_A < -2.0$
(2) $0.13 < d11 + d12 + d13 < 0.19$
(3) $\nu d3 < 30.0$, $\nu d8 < 30.0$
(4) $0.35 < 1/r4 < 0.55$
(5) $1.7 < 1/r9 < 1.9$ wherein, $r_i$ ($i = 1, 2, \ldots$) stands for the radius of curvature of the lens surface of the respective lenses beginning from the foremost surface of the front lens group, $d_i$ for the center thickness of the lenses or the air gaps between the adjacent lenses, $\nu d_i$ for the Abbe number of the lenses, and $F_A$ for the focal length of the front lens group as a whole.

The first requirement concerns the size of the lens system.

$$-2.4 < F_A < -2.0$$

In this lens system, if the value of $F_A$ which denotes the composite focal length of the first part is smaller than $-2.4$, the distance of zoom movement of the first part must be increased in order to keep the various aberrations within acceptable limits. Consequently, the lens must be increased in diameter and will lose its compactness. If the value is greater than $-2.0$, the structure of the first part must be made more complex in order to keep the various aberrations within acceptable limits. Hence, the lens system must fulfil the first requirement.

The second requirement, similarly to the first, concerns the size of the lens system.

$$0.13 < d11 + d12 + d13 < 0.19$$

Since the present invention relates to a rear stop type zoom lens and, therefore, the diaphragm is located on the image side and is fixed in position, the entrance pupil must be brought as close to the object side as possible in order to make the lens system as compact as possible. Thus, the total of the three magnitudes d11, d12 and d13 which greatly affect the location of the entrance pupil in the lens system of this invention must be considered. If the total is smaller than 0.13, the lens system can be decreased in size, but the amount of the oblique beam on the telephoto side is decreased and the comatic aberration and astigmatism are degraded to the extent of posing a serious problem. If the total is greater than 0.19, the lens system must be increased in size in order to permit passage of oblique beam and, at the same time, the compensation for spherical aberration becomes insufficient.

This is why the second requirement must be fulfilled by the present invention.

In the zoom lens system, chromatic aberration must be kept within permissible limits in each of the moving parts involved. The third requirement concerns this particular factor.

$\nu d3 < 30.0$ $\nu d5 < 30.0$

These are both of convex lenses. If the values are greater than are indicated, then it becomes difficult to keep the chromatic aberration within acceptable limits throughout the entire magnification range.

The fourth requirement is aimed at keeping within the smallest possible range the variations in spherical aberration, comatic aberration, etc. throughout the entire magnification range.

$0.35 < 1/r4 < 0.55$

In order that the spherical aberration and comatic aberration may be kept within acceptable limits throughout the entire magnification range, such aberrations must be amply compensated for in the first part which has a particularly large effect on the variations in such aberrations over the entire magnification range. If the value 1/r4 is greater than 0.55, the variations in the spherical aberration, comatic aberration, etc. over the entire magnification range cannot be decreased. If the value is smaller than 0.35, it is no longer possible to maintain the focal length on the telephoto side and, at the same time, keep such aberrations within acceptable limits. Thus, this requirement must be fulfilled by this invention.

The purpose of the fifth requirement $1.7 < 1/r9 < 1.9$ is to keep the comatic aberration within acceptable limits. Comatic aberration is particularly difficult to correct in a rear stop type zoom lens.

When the value 1/r9 is smaller than 1.7, the spherical aberration is improved but the comatic aberration becomes intolerable. If the value is greater than 1.9, it becomes particularly difficult to make the required compensation for the spherical aberration. To achieve a balance between the two aberrations, the above requirement must be fulfilled.

Now, working examples of the zoom lens of the present invention constructed in accordance with the spirit of the invention will be cited hereinafter.

In the following tables, fW=the focal length and lW=the back focal length of the lens system on the wide angle side, fT=the focal length and lT=the back focal length of the lens system on the telephoto side, and $F_A$=the composite focal length of the first.

EXAMPLE 1

FIG. 1 is a diagram which shows one lens system according to this invention. The optical data for this lens system are given in Table 1.

TABLE 1

| face | R (radius of curvature) | d̄ (distance) | Nd (refractive index) | νd (Abbe number) |
|---|---|---|---|---|
| 1 | −5.366540 | 0.041972 | 1.6481 | 33.8 |
| 2 | 1.576775 | 0.106333 | 1. | |
| 3 | −6.201956 | 0.036725 | 1.51633 | 64.0 |

TABLE 1-continued

| face | R (radius of curvature) | d̄ (distance) | Nd (refractive index) | νd (Abbe number) |
|---|---|---|---|---|
| 4 | 2.100430 | 0.084162 | 1. | |
| 5 | 3.036415 | 0.081811 | 1.80518 | 25.5 |
| 6 | −7.125202 | *0.650564 | 1. | |
| 7 | 0.645669 | 0.097621 | 1.62041 | 60.3 |
| 8 | 2.247986 | 0.005246 | 1. | |
| 9 | 0.558079 | 0.089936 | 1.62041 | 60.3 |
| 10 | 1.842916 | 0.005246 | 1. | |
| 11 | 0.464290 | 0.059361 | 1.69680 | 55.6 |
| 12 | 1.689567 | 0.043619 | 1. | |
| 13 | 22.459594 | 0.037903 | 1.80518 | 25.5 |
| 14 | 0.364344 | 0.052031 | 1. | |
| 15 | −7.104266 | 0.041437 | 1.80518 | 25.5 |
| 16 | −0.967889 | | | |

*0.650564−0.026232
fW = 1.0
fT = 1.41073
$F_A$ = 2.23279
lW = 0.97235
lT = 1.14840
angle of view 22°−29.5°
iris on the 16th face side 0.026232−0.202282

FIGS. 2A–2C and 3A–3C show the spherical aberration and sine condition (2A, 3A), astigmatism (2B, 3B) and distortion (2C, 3C) on the wide angle side of the lens system of Example 1.

EXAMPLE 2

Figure 4:
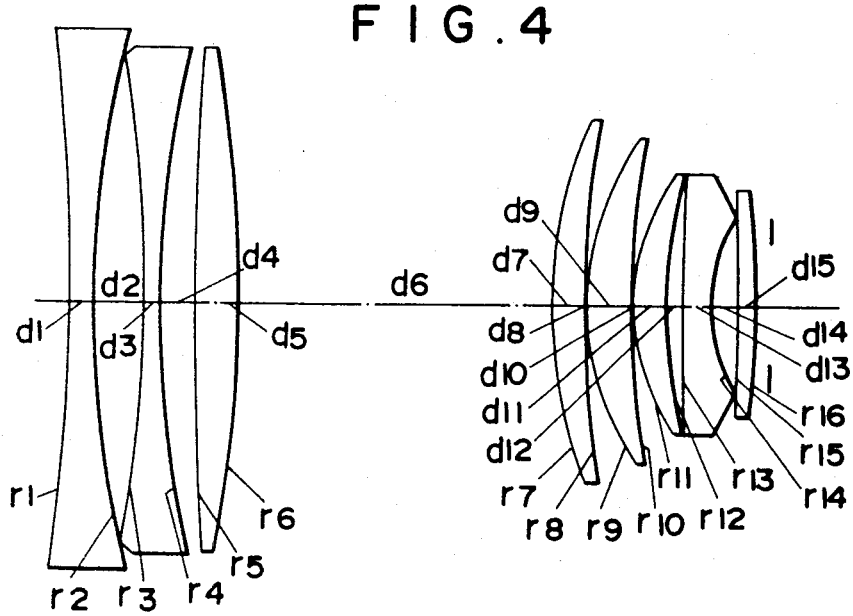
FIG. 4 is a structural diagram which shows another preferred embodiment of the rear stop type zoom lens of the present invention.
Figure 5A:
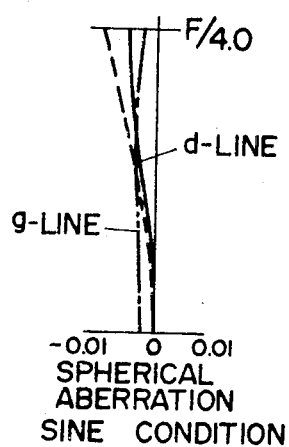
FIGS. 5A–5C and 6A–6C show the spherical aberration and sine condition (5A, 6A), astigmatism (5B, 6B) and distortion (5C, 6C) respectively on the wide angle side (5A–5C) and the telephoto side (6A–6C) of the second preferred embodiment.
Figure 5B:
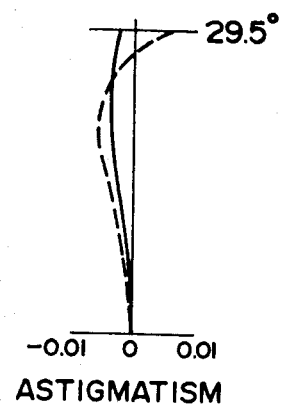
Figure 5C:
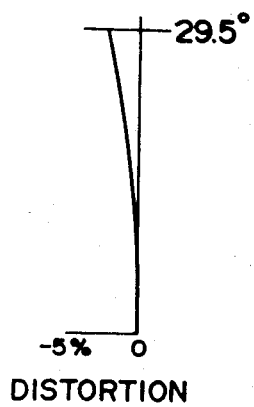
Figure 6A:
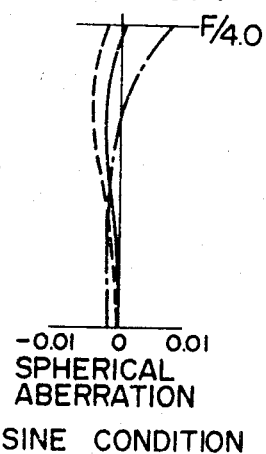
Figure 6B:
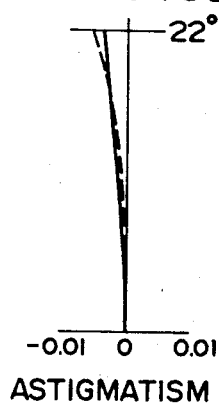
Figure 6C:
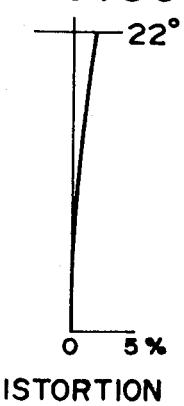

FIG. 4 is a diagram which shows another lens system according to this invention. The optical data for this lens system are given in Table 2.

TABLE 2

| face | R (radius of curvature) | d̄ (distance) | Nd (refractive index) | νd (Abbe number) |
|---|---|---|---|---|
| 1 | −3.469859 | 0.042084 | 1.66680 | 33.1 |
| 2 | 1.968508 | 0.111389 | 1. | |
| 3 | −3.052796 | 0.036824 | 1.51633 | 64.0 |
| 4 | 2.379244 | 0.060974 | 1. | |
| 5 | 6.985912 | 0.089460 | 1.80518 | 25.5 |
| 6 | −2.586222 | *0.652306 | 1. | |
| 7 | 0.855443 | 0.072317 | 1.62041 | 60.3 |
| 8 | 2.323628 | 0.005261 | 1. | |
| 9 | 0.541836 | 0.095136 | 1.62041 | 60.3 |
| 10 | 1.961966 | 0.005261 | 1. | |
| 11 | 0.465534 | 0.069411 | 1.6968 | 55.6 |
| 12 | 0.823975 | 0.028607 | 1. | |
| 13 | 3.067231 | 0.065981 | 1.80518 | 25.5 |
| 14 | 0.349174 | 0.051509 | 1. | |
| 15 | 47.595852 | 0.040222 | 1.80518 | 25.5 |
| 16 | −1.361446 | | | |

*0.652306−0.026303
fW = 1.0
fT = 1.41290
$F_A$ = −2.22887
lW = 0.98387
lT = 1.16191
angle of view 22°−29.5°
iris on the 16th face side 0.026303−0.204343

FIGS. 5A–5C and 6A–6C show the spherical aberration and sine condition (5A, 6A), astigmatism (5B, 6B) and distortion (5C, 6C) on the wide angle side of the lens system of Example 2.

EXAMPLE 3

FIG. 7 is a diagram which shows yet another lens system according to this invention. The optical data for this lens system will be given in Table 3.

TABLE 3

| face | R (radius curvature) | $\overline{d}$ (distance) | Nd (refractive index) | νd (Abbe number) |
|---|---|---|---|---|
| 1 | −4.27439 | 0.041752 | 1.68893 | 31.1 |
| 2 | 2.13568 | 0.107043 | 1. | |
| 3 | −2.86159 | 0.036533 | 1.51633 | 64.0 |
| 4 | 2.34037 | 0.058975 | 1. | |
| 5 | 10.37210 | 0.085331 | 1.80518 | 25.5 |
| 6 | −2.45025 | *0.647160 | 1. | |
| 7 | 0.87675 | 0.076459 | 1.62041 | 60.3 |
| 8 | 2.65440 | 0.005219 | 1. | |
| 9 | 0.54365 | 0.092899 | 1.62041 | 60.3 |
| 10 | 1.31794 | 0.005219 | 1. | |
| 11 | 0.46186 | 0.076459 | 1.734 | 51.3 |
| 12 | 0.96085 | 0.020221 | 1. | |
| 13 | 2.50278 | 0.077764 | 1.80518 | 25.5 |
| 14 | 0.33498 | 0.052190 | 1. | |
| 15 | 20.07320 | 0.039926 | 1.80518 | 25.5 |
| 16 | −1.43775 | | | |

*0.64716−0.026095
fW = 1.0
fT = 1.40624
$F_A$ = −2.26305
lW = 0.95816
lT = 1.128687
angle of view 22°−29.5°
iris on the 16th face side 0.026095−0.196622

FIGS. 8A–8C and 9A–9C show the spherical aberration and sine condition (8A, 9A), astigmatism (8B, 9B) and distortion (8C, 9C) on the wide angle side of the lens system of Example 3.

When the preferred embodiments described above are applied to a Leica type camera, for example, there can be formed a compact zoom lens wherein the focal length is between 37 and 55 mm, the f number is 3.8, the effective aperture of the front lens is 39 mm and the overall length is 75 mm. What is more, this zoom lens can be used with an ordinary shutter positioned to the rear. This invention, therefore, provides a zoom lens which enjoys heretofore unattainable compactness and high performance.

What is claimed is:

1. A rear stop type zoom lens, comprising a front lens group possessing negative refracting power and a rear lens group possessing positive refracting power relative to the object side which two lens groups effect variation in magnification by being moved in opposite directions on the optical axis of the entire lens, a diaphragm fixed externally and to the rear of the rear lens group, the front lens group consisting of two biconcave lenses and one convex lens and the rear lens group consisting of five lenses, the first three in order being convex meniscus lenses each having its convex surface on the object side, and satisfying the following conditions:

(1) $-2.4 < F_A < -2.0$
(2) $0.13 < d11 + d12 + d13 < 0.19$
(3) $vd3 < 30.0$, $vd8 < 30.0$
(4) $0.35 < 1/r4 < 0.55$
(5) $1.7 < 1/r9 < 1.9$ wherein, $r_i$ (i = 1, 2, ...) stands for the radius of curvature of the lens surface of the respective lenses beginning from the foremost surface of the front lens group, $d_i$ for the center thickness of the lenses or the air gaps between the adjacent lenses, $vd_i$ for the Abbe number of the lenses, and $F_A$ for the focal length of the front lens group as a whole.

2. A rear stop type zoom lens, comprising a front lens group possessing negative refracting power and a rear lens group possessing positive refracting power relative to the object side which two lens groups effect variation in magnification by being moved in opposite directions on the optical axis of the entire lens, a diaphragm fixed externally and to the rear of the rear lens group, the front lens group consisting of two biconcave lenses and one convex lens and the rear lens group consisting of five lenses, the first three in order being convex meniscus lenses each having its convex surface on the object side, and satisfying the following conditions:

(1) $-2.3 < F_A < -2.2$
(2) $0.14 < d11 + d12 + d13 < 0.18$
(3) $vd3 \approx 25.5$, $vd8 \approx 25.5$
(4) $0.42 < 1/r4 < 0.48$
(5) $1.7 < 1/r9 < 1.9$ wherein, $r_i$ (i = 1, 2, ...) stands for the radius of curvature of the lens surface of the respective lenses beginning from the foremost surface of the front lens group, $d_i$ for the center thickness of the lenses or the air gaps between the adjacent lenses, $vd_i$ for the Abbe number of the lenses, and $F_A$ for the focal length of the front lens group as a whole.

* * * * *